United States Patent [19]

Cho

[11] 4,050,473
[45] Sept. 27, 1977

[54] VALVE SEAT CLEANING MECHANISM
[75] Inventor: Nakwon Cho, Knoxville, Tenn.
[73] Assignee: Electro-Nucleonics, Inc., Fairfield, N.J.
[21] Appl. No.: 577,947
[22] Filed: May 15, 1975
[51] Int. Cl.² ............................................. F16K 1/38
[52] U.S. Cl. ..................................... 137/244; 251/333
[58] Field of Search .............. 137/242, 244; 251/333, 251/210

[56] References Cited
U.S. PATENT DOCUMENTS

| 1,621,638 | 3/1927 | McIntyre et al. | 137/242 |
| 2,213,998 | 9/1940 | Sifkovitz | 137/242 |
| 2,787,126 | 4/1957 | Kleczek | 137/242 |

FOREIGN PATENT DOCUMENTS 1,040,976 10/1958 Germany ........................ 251/210

Primary Examiner—Arnold Rosenthal
Attorney, Agent, or Firm—Cooper, Dunham, Clark, Griffin & Moran

[57] ABSTRACT

A valve seat cleaning device utilizing a valve head of resilient material in the shape of a frustum of a cone. A flexible circular disk is positioned against that end of the valve head of lesser diameter. The circular disk is of somewhat greater diameter than that end of the valve head so that it may perform a wiping action to wipe away dirt particles from the valve seat.

4 Claims, 6 Drawing Figures

VALVE SEAT CLEANING MECHANISM

BACKGROUND AND BRIEF DESCRIPTION OF THE INVENTION

This invention relates to valve mechanisms. More particularly, it provides a valve seat cleaning mechanism to remove dirt particles that may be on a valve seat and which would otherwise interfere with correct operation of the valve.

The present invention utilizes a flexible disk for the purpose of wiping away dirt particles from the valve seat. That disk is attached to a valve head of resilient material, which head makes ultimate contact with the valve seat in the closed position of the valve to provide the valving action.

The use of a flexible disk in a valve mechanism is known. In U.S. Pat. No. 3,548,868 issued Dec. 22, 1970 to Mullaney, III, a flexible auxiliary valve seat is disclosed. The flexible disk shown in that patent is not for valve seat cleaning but rather is for the formation of a valve seal. U.S. Pat. No. 2,977,974 to Browne which issued Apr. 4, 1961 discloses a valve head utilizing a rubber disk. While a cleaning action is described in the patent, the disk serves as the primary valve sealing member. Kushida U.S. Pat. No. 3,841,347 which issued Oct. 15, 1974 is similar to the Browne patent in disclosing a flexible disk which provides a valve cleaning action. That disk, however, forms the principal seal in the valve.

In the present invention, a valve member is utilized that includes a valve head of resilient material in the shape of a frustum of a cone. A flexible circular disk is positioned against the valve head, and particularly that end of the valve head which is of lesser diameter than the other end. The diameter of the flexible disk is somewhat greater than the diameter of the valve head end against which it is positioned. In this fashion a wiping member is formed which makes initial contact with a valve seat when the valve head is being moved into a valve closed position. Impurities on the valve seat are thus wiped off by the flexible disk. Further movement of the valve head provides for the sealing between the valve head and the valve seat. In this position of the valve head, the flexible disk does not form any part of the sealing mechanism. In fact, puckering of the flexible disk takes place so that no seal is formed.

The invention will be more completely understood by reference to the following detailed description, which is to be taken in conjunction with the appended drawing.

DETAILED DESCRIPTION

Figure 1:
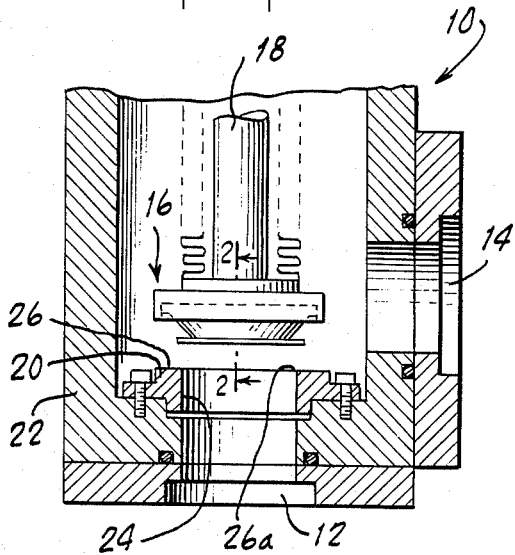
FIG. 1 is a partly sectional view of a valve assembly embodying the invention.
Figure 2:
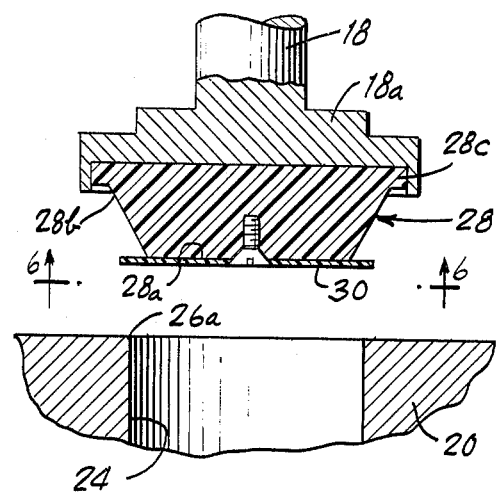
FIGS. 2 and 3 are enlarged views of part of the assembly of FIG. 1, showing the movable valve member respectively in valve open and valve closed positions.

Referring to FIG. 1, a valve assembly 10 is shown. The assembly 10 includes an inlet port 12 and an outlet port 14. A movable valve member 16 closes off the inlet port. The valve member 16 is driven by a shaft 18 that moves vertically in the orientation of the valve assembly 10 shown in FIG. 1.

The valve seat portion of the valve assembly 10 is defined by a valve seat member 20 which may be screwed or otherwise adhered to a part of assembly housing 22. The valve seat member 20 may also be an integral part of that housing. In any event, the valve seat member 20 includes a passage 24 of circular section therethrough. Upper surface 26 of the valve seat member is planar and leads directly and at a right angle into the passage 24. The edge 26a of the planar section 26 constitutes the actual valve seat in the valve assembly 10.

Dirt or other particles may adhere to the valve seat 26a, and it is desired to clean that valve seat to ensure that an appropriate seal is completed when the passage 24 is to be closed off. To that end the valve member 16 includes a valve head of resilient material such as Teflon which is in the shape of a frustum of a cone having first and second spaced apart transverse sections 28a and 28b. The diameter of the first transverse section 28a is less than the diameter of the second transverse section 28b. The transverse section 28b may be formed with an outer peripheral flange 28c to retain the valve head 28 in position in piece 18a that forms a part of the valve shaft 18.

Attached to the transverse section 28a of the valve head 28 (to the transverse section of lesser diameter) is a flexible circular disk 30, which may also advantageously be made of Teflon. The disk 30 is secured to the valve head 28 by means of a screw 32. Alternatively, the flexible disk 30 could be machined as an integral part of the valve head 28. The disk in fact forms a part of the valve head, and acts as a wiping mechanism.

Figure 3:
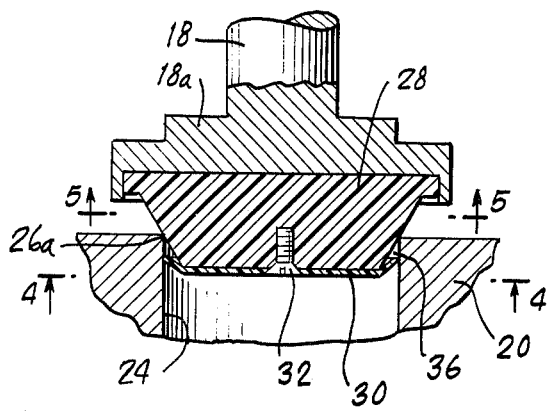
Figure 5:
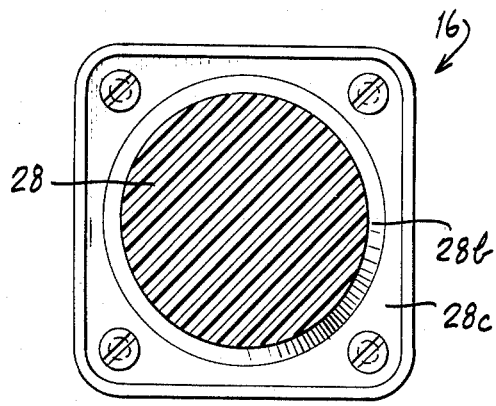
Figure 6:
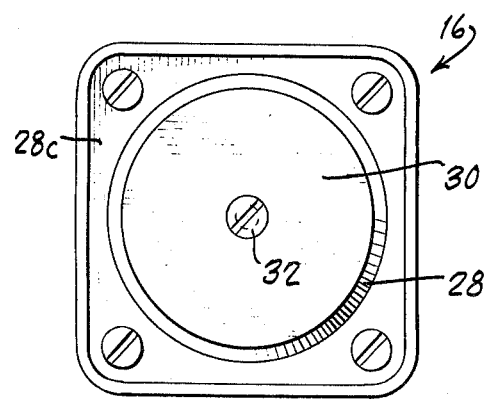

To explain the action of the disk 30 in wiping the valve seat 26a clean, consider the action when the valve stem 18 is moved downwardly, moving the entire valve member 16 downwardly. As the flexible disk 30 makes contact with the valve seat 26a, dirt or other particles on the valve seat will be wiped away as the flexible disk moves against and finally past the valve seat and into the valve passage 24. Particles of dirt or other debris on the valve seat will thus be wiped clear of the valve seat, so that a good seal may be formed between the valve seat 26a and the valve head 28 as shown in FIG. 3. The diameter of the valve seat 26a is intermediate the diameter of the first transverse section 28a and the second transverse section 28b of the valve member 28. This ensures that contact is made by the valve head 28 against the valve seat 26a, as shown in FIG. 3, ensuring a complete seal therebetween.

Figure 4:
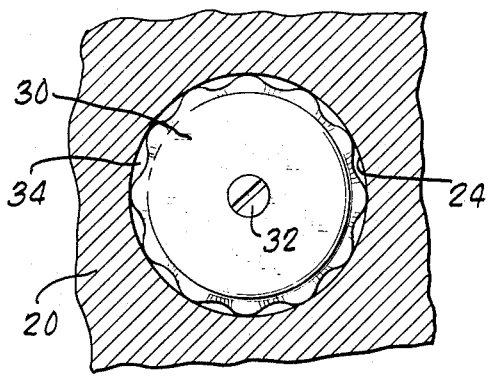
FIGS. 4–6 are views looking in the directions of arrows 4—4, 5—5, and 6—6 in FIGS. 2 and 3.

As shown in FIG. 4, the disk 30 is puckered along its edge when the valve member 16 is in the position shown in FIG. 3. Spaces 34 are occasioned between parts of the edge of the flexible disk 30 and the surface of the valve passage 24. These spaces permit the fluid medium flowing in the passage 24 to be present on both sides of the disk 30. There is no fluid medium trapped in the spaces 36 shown in FIG. 3.

Thus, the entire sealing action of the valve is occasioned by contact of the valve head 28 with the valve seat 26a.

It has been found that making the valve head 28 of soft resilient material such as Teflon enables dirt and other particles to be embedded therein, further aiding in the complete sealing action of the valve notwithstanding the presence of dirt or other particles on the valve seat. However, as noted above, the flexible disk 30 serves to clean that valve seat, so that the embedding of many particles in the valve head will not generally take place.

It will be understood that a presently preferred embodiment of the invention has been described above. Changes will occur to those skilled in the art. It should be understood, therefore, that the invention is as defined in the appended claims.

What is claimed is:

1. A valve comprising a valve head of resilient material in the shape of a frustum of a cone having first and second spaced apart transverse sections, the diameter of said first transverse section being less than the diameter of said second transverse section, and a flexible circular disk forming a part of said valve head and coaxial therewith and positioned against said first transverse section and of a diameter greater than that of said first transverse section, in combination with a circular valve seat of a diameter intermediate those of said first transverse section and said circular disk, in which said valve seat leads into a valve passage of circular section, in which said circular disk is puckered along the edge thereof against the surface of said valve passage when said valve head is in a valve closed position so as not to form a seal between said disk and said valve passage surface, a seal being formed between points on the frusto-conical surface of said valve head and said valve seat.

2. A valve comprising a valve head of resilient material in the shape of a frustum of a cone having first and second spaced apart transverse sections, the diameter of said first transverse section being less than the diameter of said second transverse section, and a flexible circular disk forming a part of said valve head and coaxial therewith and positioned against said first transverse section and of a diameter greater than that of said first transverse section, in combination with a circular valve seat of a diameter intermediate those of said first transverse section and said circular disk, in which said valve seat comprises the edge of a planar surface that leads directly and at a right angle into a passage of circular section having a diameter equal to said intermediate diameter.

3. A valve comprising a valve seat and a valve passage communicating with said valve seat, a valve head of resilient material having an outer surface of increasing diameter which bears along a sealing portion thereof against said valve seat to seal said seat in the closed position of said valve, and a flexible disk extending outwardly from said outer valve head surface from a region of lesser diameter than that of said sealing portion, said disk having an outer edge thereof which bears against said valve passage in said valve closed position, said disk being puckered along said outer edge against said valve passage when said valve head is in said valve closed position so as not to form a seal between said disk and said valve passage.

4. A valve member according to claim 3 in which said valve head and disk are made of Teflon.

* * * * *